Jan. 6, 1970 — W. C. SOMMER — 3,488,067
AIR COOLED PIPE PENETRATIONS IN CONCRETE WALLS
Filed Sept. 12, 1967

INVENTOR.
WALTER C. SOMMER
BY
his ATTORNEY

United States Patent Office 3,488,067
Patented Jan. 6, 1970

3,488,067
AIR COOLED PIPE PENETRATIONS IN CONCRETE WALLS
Walter C. Sommer, Wyomissing, Pa., assignor to Gilbert Associates, Inc., Reading, Pa.
Filed Sept. 12, 1967, Ser. No. 667,211
Int. Cl. F16l 53/00, 55/00, 41/00
U.S. Cl. 285—41                    3 Claims

ABSTRACT OF THE DISCLOSURE

The invention relates to an assembly for taking hot fluid conducting pipe lines through the concrete walls of a nuclear containment vessel.

Surrounding the pipe through which the hot fluid flows is an insulating ring surrounded by a dead air space which, in turn, is surrounded by a metallic jacket adjacent the concrete wall of a containment vessel. Cooling air is pumped through said jacket. A bellows forms an end seal of the dead air space and permits expansion of the hot fluid conducting pipe relative to the end ring fastener on the concrete wall. The entire unit is pneumatically testable for ensuring no leakage.

BACKGROUND OF THE INVENTION

Process pipes projecting through containment vessel walls, such as the concrete walls of a nuclear containment, have provided problems in the past, such as that of strains or ruptures in the seal as the result of expansion of the process pipe relative to the containment vessel wall.

Also difficulties have been experienced in maintaining and testing the various welds or joints between the inside and outside of the containment vessel.

Furthermore, in the use of water as a coolant, danger of a possible steam explosion has always been present in view of possible leakage of water into the process pipe or other high temperature media.

An object of the present invention is to provide a novel containment vessel liner which is particularly suitable for taking hot pipe lines through the concrete walls of a nuclear containment and which is devoid of the above-named disadvantages of prior pipe penetrations for conducting hot process fluids, in excess of 150° F., through containment vessel walls of concrete and the like.

Another object is to provide an end wall inside the vessel of such construction that a pipe rupture internal to the containment may not produce sufficient moments or end thrust which may, in fact, fail the vessel. The bellows is pressurized on its external side so that squirming is thereby minimized.

Other objects and advantages will become more apparent from a study of the following description taken with the accompanying drawing wherein.

Figure 1:
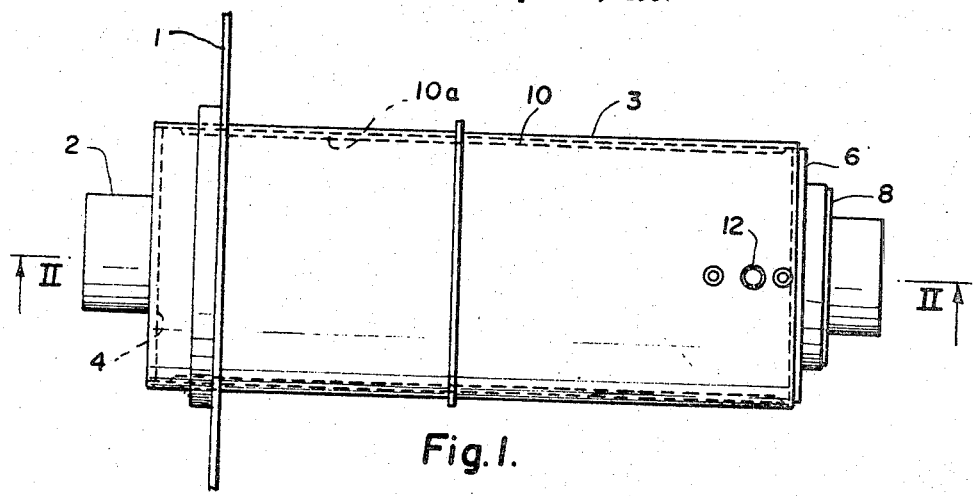
FIG. 1 is a plan view of an air cooled pipe penetration assembly for penetrating concrete walls of a nuclear containment with an inner steel liner 1.
Figure 2:
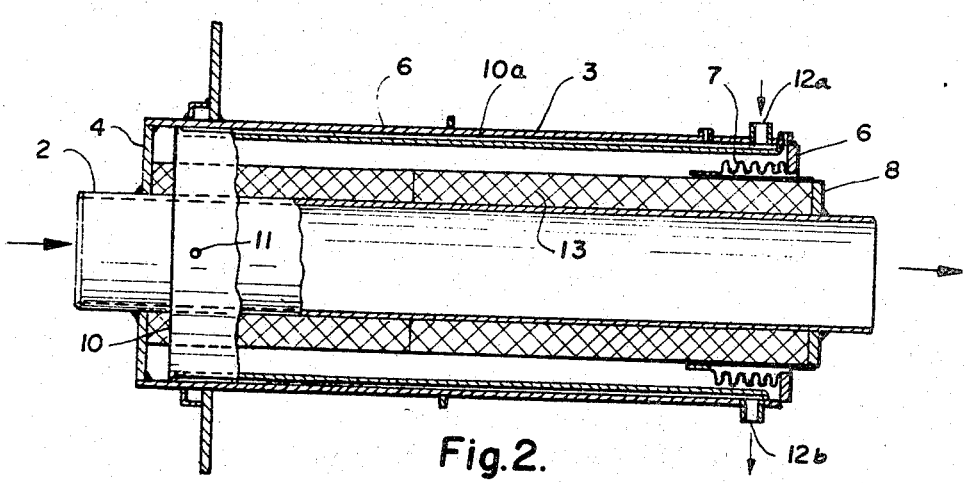
FIG. 2 is a vertical, cross-sectional view taken through most of the structure in FIG. 1; and, FIG. 3 is an enlarged, fragmentary, cross-sectional view showing a portion of the assembly shown in FIG. 2.

Referring more particularly to the drawing, numeral 1 denotes a metal end ring, for abutting the inner surface of a concrete wall and which is welded to the outer surface of a cooling metallic sleeve 3 of cylindrical shape. The ends of sleeve 3 are closed by end walls 4, 6 and 8. End wall 4 is welded to a pipe or conductor 2 through which hot process fluid is passed at a temperature in excess of 150° F. flowing through the pipe from the left to the right hand side (or vice versa), as viewed in FIG. 2, and through the penetration in the containment vessel wall, which may be concrete having a thickness of about 3½ feet.

The heat from the process fluid is dissipated from the pipe 2 to insulation 13, in the form of a ring, and from there to a cooling jacket formed from an outer cooling sleeve 3 and an inner cooling sleeve or embossment 10. The outer wall of the cooling jacket is in contact with the concrete wall. Structural requirements dictate that the surface of the sleeve should not exceed 150° F. For this purpose, the heat which is dissipated by the pipe 2 is removed by pumping air from the inlet pipe 12a, through the cooling jacket, to outlet pipe 12b. The use of air or other gas rather than water prevents possible steam formation and consequent explosions. The cooling jacket is coextensive with the process flow.

The construction shown provides double barriers between the inside and outside of the containment vessel, as required by the Atomic Energy Commission.

Figure 3:
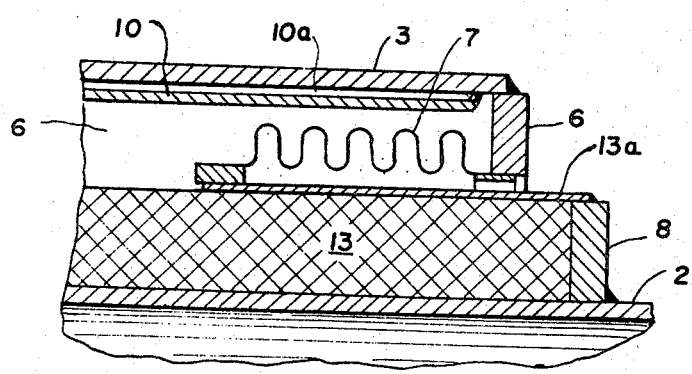

As shown more clearly in FIG. 3, a metal bellows 7 has its ends sealed to the end annular wall 6 and to a sleeve 13a on the outer surface of the insulation 13 so as to enable expansion of the process pipe 2 relative to the containment vessel wall.

Seals are thus accomplished in the dead air space 6 by means of the bellows assembly. This construction allows pneumatic testing of the liner weld 14 and all welds, as well as permitting expansion or movement of pipe 2 with respect to the end ring fastener 1 on the concrete wall. Thus the cooling sleeve 3 and air cooled jacket are completely independent of the seals and the sleeve 3 is directly adjacent the hole surface in the concrete wall which it is intended to project.

The end wall construction is of such design that a pipe rupture internal to the containment may not produce sufficient moments or end thrust which may, in fact, fail the vessel, the bellows being pressurized on its external side so that squirming is thereby minimized.

While the above construction has been described in connection with a nuclear containment, it is apparent that it would be equally applicable for similar assemblies.

Thus it will be seen that I have provided an efficient, safe and highly reliable assembly for taking hot fluid conducting pipe lines through the concrete walls of a nuclear containment or the like, which is devoid of any dangers resulting from steam explosion and which enables the testing of all seals pneumatically between the inside and outside of the containment vessel, also wherein the air cooled jacket is completely independent of the seals.

While I have described a single embodiment of my invention, it will be understood that this is by way of illustration only, and that various changes and modifications may be made within the contemplation of my invention and within the scope of the following claims.

I claim:

1. A pipe assembly for insertion in a cylindrical hole of a concrete wall, comprising an annular jacket surrounded by and in contact with a cylindrical outer wall, which wall is adapted to be closely adjacent the hole-defining portion of a concrete wall, an inlet and outlet for a cooling fluid circulated through said jacket communicating therewith exteriorly of said pipe assembly, a pipe spaced from and surrounded by said jacket and extending concentrically thereof through which hot processing fluid is conducted, an annular insulating layer surrounding said pipe, an annular end wall extending between one end of said outer wall and said pipe, and a flexible end wall means sealed to the other end of said outer wall and to said pipe so as to provide a hermetically sealed dead-air space between said end wall and said flexible end wall means and so as to allow expansion of said other end of said pipe relative to said outer wall.

2. A pipe assembly as recited in claim 1 wherein a gas is circulated in said annular jacket and wherein said flexible end wall means includes a bellows.

3. A pipe assembly as recited in claim 1 together with an integral ring extending radially outwardly of said outer wall and engageable with the outer face of said concrete wall.

References Cited

UNITED STATES PATENTS

| | | | |
|---|---|---|---|
| 1,367,349 | 2/1921 | Barnes | 285—41 |
| 1,535,209 | 4/1925 | Dubbs | 285—41 |
| 2,127,073 | 8/1938 | Topping | 285—41 |
| 3,017,202 | 1/1962 | Swaney | 285—41 |
| 3,344,803 | 10/1967 | Charles et al. | 285—47 X |

FOREIGN PATENTS

| | | |
|---|---|---|
| 1,178,105 | 12/1958 | France. |
| 1,041,042 | 9/1966 | Great Britain. |
| 68,401 | 2/1929 | Sweden. |

MEYER PERLIN, Primary Examiner

ALBERT W. DAVIS, Assistant Examiner

U.S. Cl. X.R.

165—47; 176—87; 285—47, 158, 300